(12) United States Patent
Johnson

(10) Patent No.: US 6,186,402 B1
(45) Date of Patent: Feb. 13, 2001

(54) CREDIT AND SMART CARD READERS

(75) Inventor: James J. Johnson, Lake Forest, CA (US)

(73) Assignee: Axiohm Transaction Solutions, Inc., Ithaca, NY (US)

(*) Notice: Under 35 U.S.C. 154(b), the term of this patent shall be extended for 0 days.

(21) Appl. No.: 09/369,293

(22) Filed: Aug. 6, 1999

Related U.S. Application Data

(63) Continuation-in-part of application No. 09/272,661, filed on Mar. 18, 1999.

(51) Int. Cl.[7] .................................................. G06K 13/00
(52) U.S. Cl. ............................................ 235/482; 235/475
(58) Field of Search ..................................... 235/475, 482

(56) References Cited

U.S. PATENT DOCUMENTS 5,589,681 * 12/1996 Merlin et al. .................... 235/482

* cited by examiner

Primary Examiner—Harold I. Pitts
(74) Attorney, Agent, or Firm—Salzman & Levy

(57) ABSTRACT

A credit or smart card reader for processing bent, bowed, extremely warped, or cut credit, or smart cards. A standard reader has an insertion deck for inserting a card to be read and processed. The card to be read is inserted into a slot provided in the insertion deck. The card will travel along a processing path contacting an extended supporting card ramp. The bent, bowed, extremely warped, or cut credit or smart card will contact the extended supporting card ramp, allowing for its processing.

5 Claims, 4 Drawing Sheets

CREDIT AND SMART CARD READERS

RELATED PATENT APPLICATION

This application is a continuation-in-part of copending parent application, Ser. No.09/272,661, filed Mar. 18, 1999. The teachings described in this parent application are incorporated herein by reference.

FIELD OF THE INVENTION

The present invention relates to credit card and smart card readers and, more particularly, to apparatus for processing warped, bowed, or bent credit and smart cards.

BACKGROUND OF THE INVENTION

Unfortunately, warped credit and smart cards are a ubiquitous phenomenon. These sorts of cards tend to deform and warp easily when disposed in wallets that are carried in back pockets. The reading of such bent, bowed, or warped credit and smart cards can be a problem for a card reader.

For example, some credit and smart card readers, such as Axiohm Model No. 170 readers, have a debris opening to allow items other than full credit cards to drop out of the card reader. This opening prevents frequent jamming that would require maintenance and repair.

It has been observed that bent, bowed, or warped cards tend to drop through the aforementioned debris opening without being processed. This is due to the fact that the warped card may not follow the processing path within the reader. The leading edge of a warped card can pass through the insert deck without being captured. Therefore, when the trailing edge passes the insert station, since no support is provided for the card, it can drop through the debris opening without being processed.

The aforementioned parent application described an apparatus by which bowed or warped credit cards could be processed within a card reader having a debris opening. In the parent application, a card ramp extended into the card slot area to catch the edge of an extremely warped card, allowing the card to be read. The card ramp was attached to one or both sides of the chassis.

After placing the apparatus in operation, it was discovered that the reader did not always work for extremely warped cards. It was suggested that the ramp extend a little further across the card slot opening. It was also discovered that when a user fraudulently cut the corners off the credit card, either or both of the previous ramps could be bypassed.

The current invention features a new ramp design that extends across the entire card slot opening. The new ramp protrudes from the back of the chassis, and eliminates the possibility of extremely warped or cut cards from bypassing the system. The newly designed ramp can be retrofitted into the old card readers by adhesively attaching or snap fitting them into place. The retrofitted system maintains the half card drop out feature.

SUMMARY OF THE INVENTION

In the case of an average warped, bowed, or bent card being presented to a card reading device, a debris opening does not normally trap a deformed card. The card is not confiscated, since the leading edge of the card makes contact with the card ramp, forcing the card into the card path.

It was discovered, however, that extremely warped or cut cards can miss the previously designed ramp of the card reader described in the aforementioned patent application, Ser. No. 09/272,661. The ramp may not perform its intended function; the card may not be captured in the card reader slot. Therefore, when the trailing edge passes the insert station, since no support is provided for the card, it can drop through the debris opening without being processed.

In accordance with the present invention, there is provided an improved credit, or smart card reader for processing bent, bowed, extremely warped, or cut credit or smart cards. The reader comprises an insertion deck for inserting a card to be read and processed, as was previously provided. The card is inserted into a slot provided in the insertion deck. The card travels along a processing path contacting a supporting card ramp, which now extends across the entire width of the card slot opening. Once captured, the normal card can be processed in the usual manner. A debris opening is provided, as before, below the processing path adjacent the insertion deck. The debris opening allows any item other than a full card to drop out of the processing path.

It is an object of the present invention to provide an improved credit, or smart card reader.

It is another object of this invention to provide a credit, or smart card reader that will process bent, bowed, extremely warped, or cut credit cards.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components will bear the same numbering and designation throughout the figures.

DESCRIPTION OF THE PREFERRED EMBODIMENT

Generally speaking, the invention features an improved credit, or smart card reader for processing bent, bowed, extremely warped, or cut credit or smart cards. The reader comprises an insertion deck for inserting a card to be read and processed. The card is inserted into a slot provided in the insertion deck. The card travels along a processing path, contacting a supporting card ramp, which now extends across the entire width of the debris slot opening. A deflection guide is provided within the card reader for receiving the leading edge of a warped card, and redirecting the card into the processing path.

Figure 1A:
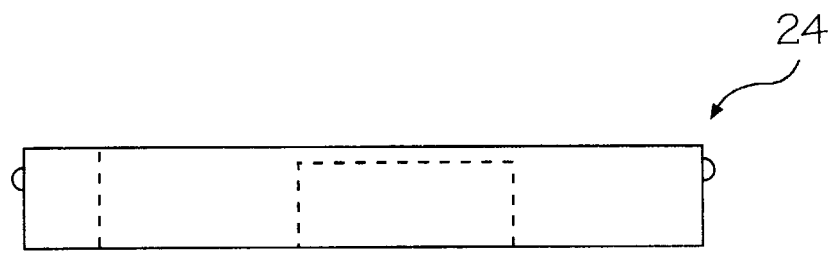
FIGS. 1a, 1b and 1c illustrate front, side and top views, respectively, of the card guide of the card reader apparatus of this invention.
Figure 1B:
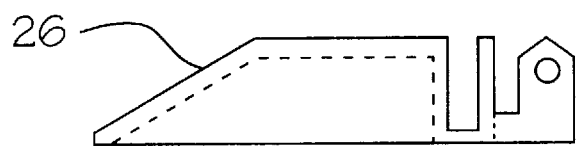
Figure 1C:
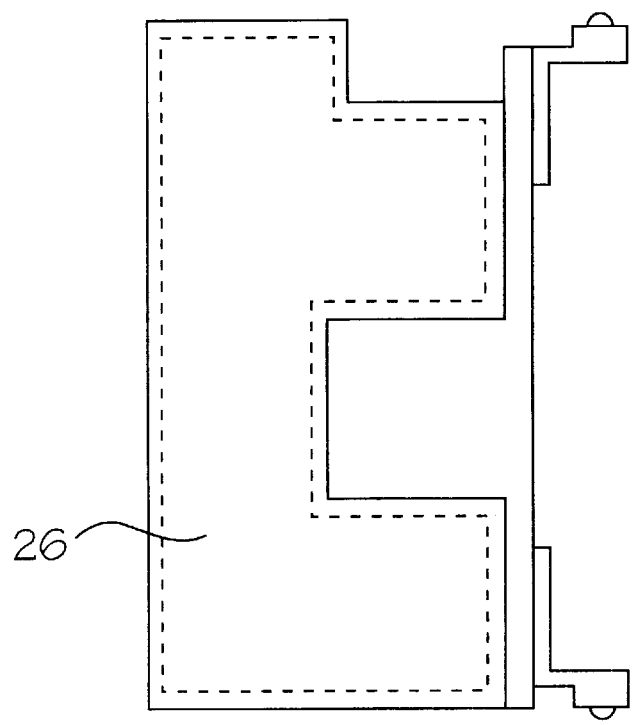
Figure 2:
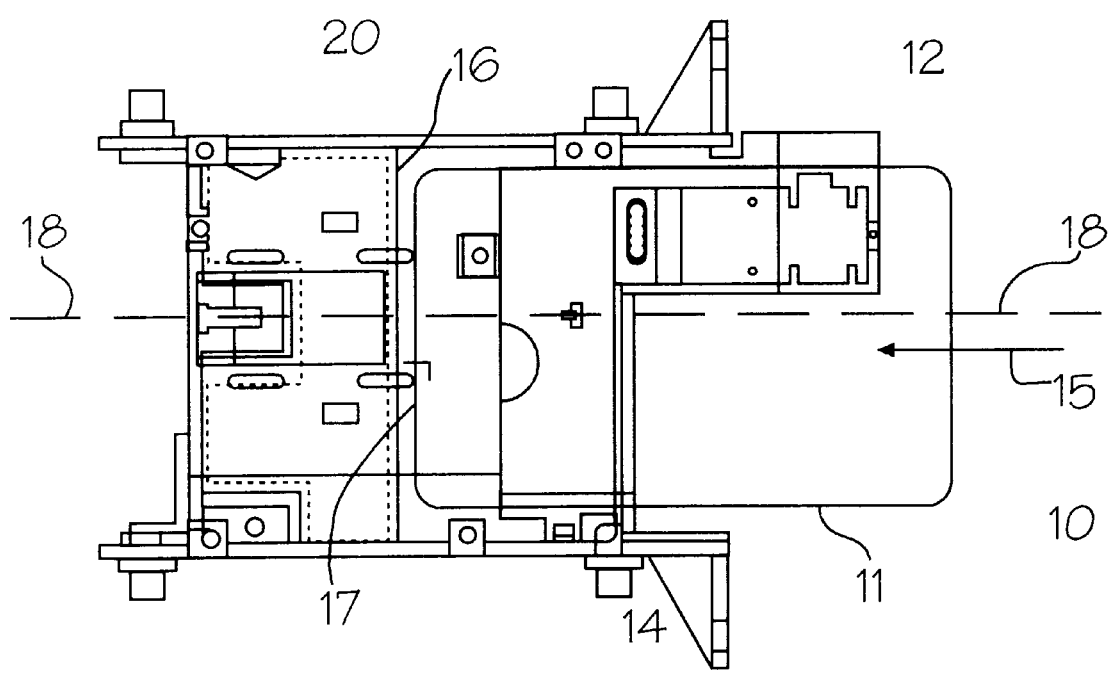
FIG. 2 depicts a top view of the insertion deck and extended card ramp for the card reader apparatus of FIG. 1.
Figures 3, 4:
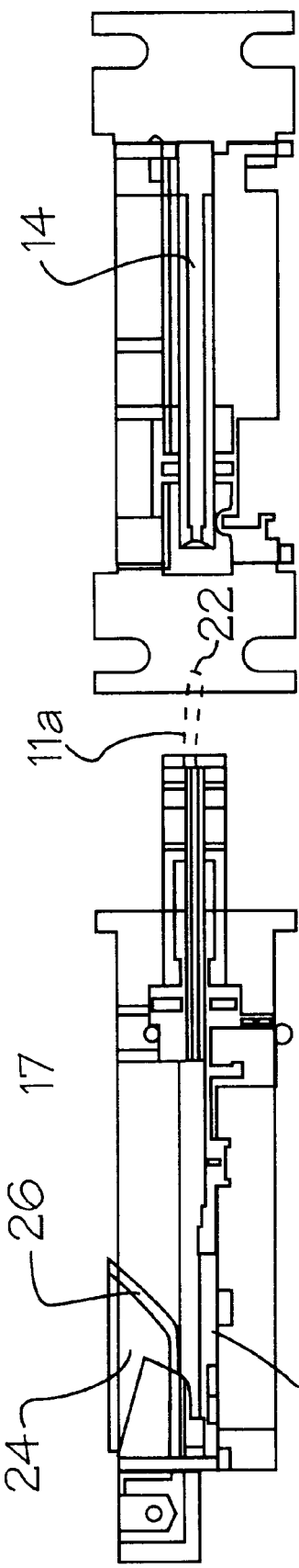
FIG. 3 shows a front view of the insertion deck depicted in FIG. 2.
FIG. 4 illustrates a side view of the card guide disposed within the card reader with a bent card shown in phantom view.

Now referring to FIG. 2, a top view of the insertion deck 12 of a card reader device 10 is illustrated. A credit card 11 is shown being inserted (arrow 15) into the slot 14 of the insertion deck 12, as best observed with reference to FIG. 3. The leading edge 17 of a straight, unbowed card 11 is able to reach the card ramp 16, thus allowing the card 11 to be supported, as it travels along the processing path, shown by dotted line 18.

Figure 5:
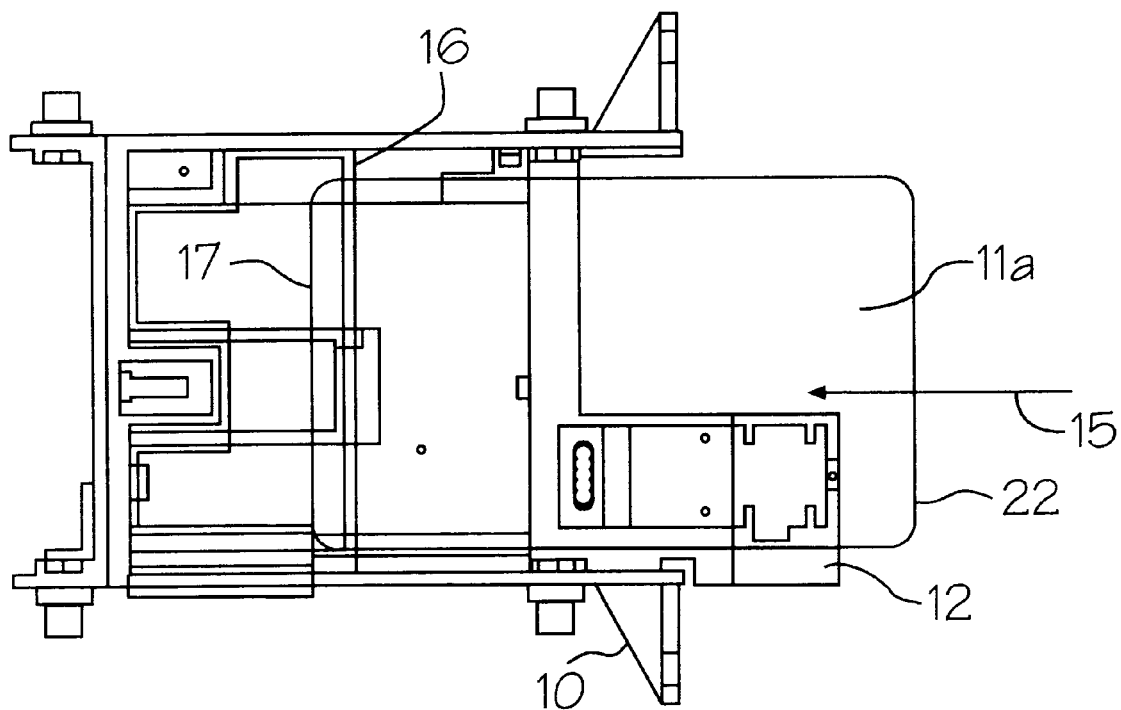
FIG. 5 shows a bottom view of the card reader apparatus illustrated in FIGS. 2 through 4.

Referring to FIG. 5, an extremely bowed card 11a (best shown in FIG. 4 with dotted lines) is inserted (arrow 15) into the card reader 10, and comes into contact with the extended card ramp 16. The leading edge 17 of the card 11a, now being able to contact card ramp 16, cannot drop through debris opening 20 (FIG. 2), when the trailing edge 22 passes through the insertion slot 14, owing to the fact that the bowed card 11a now has support at either edge 17 or 22, respectively.

Referring to FIGS. 1a, 1b, 1c and 4, a deflection guide 24 is shown having a curved or angled surface 26. The deflection guide 24 is disposed above the card ramp 16. The leading edge 17 of an upwardly bowed card 11a (not shown in this figure) contacts the curved or angled surface 26 of the deflector guide 24, as it is inserted into the card reader 10. The curved or angled surface 26 is impinged by the leading edge 17 of the bowed card 11a, causing the card 11a to deflect into the processing path 18.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A credit or smart card reader for reading and processing bent, bowed, warped, or cut credit or smart cards, comprising:

means defining a processing path upon which a credit or smart card is caused to travel;

an insertion deck disposed along said processing path for inserting said credit or smart card to be read and processed by said credit or smart card reader;

means defining a debris opening disposed below said processing path adjacent said insertion deck, said debris opening for allowing any item other than a full credit or smart card to drop out of said processing path; and an extended card ramp disposed along said processing path juxtaposed to said insertion deck and fully extending across said debris opening for receiving a bent, bowed, extremely warped, or cut credit or smart card, said extended card ramp supporting a leading edge of said credit or smart card along said processing path.

2. The credit or smart card reader for reading and processing bent, bowed, warped credit, or smart card, in accordance with claim 1, further comprising a deflection guide juxtaposed to said processing path.

3. The credit or smart card reader for reading and processing bent, bowed, warped credit, or smart cards, in accordance with claim 1, wherein said deflection guide comprises an angled surface for deflecting a leading edge of an impinging credit or smart card.

4. The credit or smart card reader for reading and processing bent, bowed, warped credit, or smart cards, in accordance with claim 1, wherein said deflection guide comprises a curved surface for deflecting a leading edge of an impinging credit or smart card.

5. The credit or smart card reader for reading and processing bent, bowed, or warped credit, or smart cards, in accordance with claim 2, wherein said deflection guide comprises a pair of guide members disposed above and below said processing path.

* * * * *